(12) United States Patent
Yoneda et al.

(10) Patent No.: US 9,894,180 B2
(45) Date of Patent: Feb. 13, 2018

(54) DEVICE, DEVICE MANAGEMENT APPARATUS, RELAY APPARATUS, AND TERMINAL APPARATUS THAT ARE CONNECTED WITH CONTENT CENTRIC NETWORK, AND COMMUNICATION METHOD

(71) Applicant: Panasonic Intellectual Property Corporation of America, Torrance, CA (US)

(72) Inventors: Takahiro Yoneda, Osaka (JP); Eiichi Muramoto, Kanagawa (JP); Ryota Ohnishi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 254 days.

(21) Appl. No.: 14/849,455

(22) Filed: Sep. 9, 2015

(65) Prior Publication Data
US 2016/0088123 A1   Mar. 24, 2016

(30) Foreign Application Priority Data
Sep. 18, 2014  (JP) .................... 2014-190421

(51) Int. Cl.
*H04L 29/08* (2006.01)
*H04L 1/16* (2006.01)

(52) U.S. Cl.
CPC ............ *H04L 67/32* (2013.01); *H04L 1/1685* (2013.01); *H04L 67/2842* (2013.01); *H04L 67/325* (2013.01)

(58) Field of Classification Search
CPC ....... H04L 1/1685; H04L 1/18; H04L 1/1822; H04L 1/1825; H04L 1/1864;
(Continued)

(56) References Cited

U.S. PATENT DOCUMENTS 8,612,617 B2 * 12/2013 Yaqoob ............... H04L 12/1868
370/312
2002/0124096 A1 * 9/2002 Loguinov ............ H04L 1/0001
709/230
(Continued)

OTHER PUBLICATIONS

Van Jacobson et al., "Networking Named Content" ACM CoNEXT'09, Dec. 2009.

*Primary Examiner* — Ruolei Zong
(74) *Attorney, Agent, or Firm* — Greenblum & Bernstein, P.L.C.

(57) ABSTRACT

A device is provided that is connected with a content centric network. The device includes a request reception unit that receives a request packet that requests data that are generated by the device. The device also includes a data transmission unit that transmits the requested data to a CCN network in a case where the data that are requested by the request packet, which is received by the request reception unit, are present in the device. The device further includes a negative acknowledgement unit that transmits a packet that indicates a negative acknowledgement, which includes information about a generation time as a time when the requested data are generated to the CCN network, in a case where the data that are requested by the request packet that is received by the request reception unit are absent in the device.

18 Claims, 10 Drawing Sheets

(58) Field of Classification Search
CPC ... H04L 1/1887; H04L 67/28; H04L 67/2842; H04L 67/32; H04L 67/322; H04L 67/325; G06F 11/00
USPC .......................................................... 709/217
See application file for complete search history.

(56) References Cited

U.S. PATENT DOCUMENTS

| | | | |
|---|---|---|---|
| 2003/0126238 A1* | 7/2003 | Kohno | H04L 1/0009 709/220 |
| 2003/0131111 A1* | 7/2003 | Kimura | H04L 67/42 709/228 |
| 2009/0287835 A1 | 11/2009 | Jacobson | |
| 2015/0009897 A1* | 1/2015 | Wilhelmsson | H04L 1/1887 370/328 |
| 2015/0039754 A1* | 2/2015 | Gupta | H04L 41/147 709/224 |

* cited by examiner

DEVICE, DEVICE MANAGEMENT APPARATUS, RELAY APPARATUS, AND TERMINAL APPARATUS THAT ARE CONNECTED WITH CONTENT CENTRIC NETWORK, AND COMMUNICATION METHOD

BACKGROUND

1. Technical Field

The present disclosure relates to a device, a device management apparatus, a relay apparatus, and a terminal apparatus that are connected with a CCN (Content Centric Network), and a communication method.

2. Description of the Related Art

In recent years, a CCN technology has been suggested such as information centric networking (ICN) in which content data may be obtained by specifying not the location where the content data are present but the name of the content data themselves, for example.

For example, U.S. Pat. No. 8,386,622 and Van Jacobson, Diana K. Smetters, James D. Thornton, Michael F. Plassi, Nicholas H. Briggs, and Rebecca L. Braynard, "Networking Named Content", ACM CoNEXT, 2009 suggest a technology referred to as CCN as a technology that represents information centric networking (ICN), for example.

In the ICN including the CCN, a terminal apparatus of a user sends out a request packet that specifies not the location where the content data are present but the name of the content data themselves to the network so as to obtain the content data. Then, when a content provider that provides the contents receives the request packet, the content provider sends out a data packet of the content data that correspond to the name.

In addition, in the ICN including the CCN, two new kinds of packets that indicate negative acknowledgements (hereinafter denoted as negative acknowledgement packet) are being provided other than the request packet and the data packet. One of the negative acknowledgement packets is a negative acknowledgement packet that indicates loss of a packet and time-out due to congestion on the network. The other of the negative acknowledgement packets is a negative acknowledgement packet that indicates absence of the content data.

SUMMARY

However, even if above U.S. Pat. No. 8,386,622 and the above cited document "Networking Named Content" provide the negative acknowledgement packets that indicate absence of the content data, the terminal apparatus that transmits the request packet and receives the negative acknowledgement packet may only recognize that the terminal apparatus is not able to receive the content data that correspond to the name specified for the request packet. That is, above U.S. Pat. No. 8,386,622 and the above cited document "Networking Named Content" have a problem that load reduction for a data provider is not taken into consideration and power saving may not be facilitated.

One non-limiting and exemplary embodiment provides a device, a device management apparatus, a relay apparatus, and a terminal apparatus that facilitate power saving.

In one general aspect, the techniques disclosed here feature a device that is connected with a content centric network, including a processor and a non-transitory memory having stored therein instructions which, when executed by the processor, cause the processor to perform operations including: receiving a request packet that requests data which are generated by the device; transmitting the requested data to the network in a case where the data that are requested by the received request packet are present in the device; and transmitting, to the network, a packet that indicates a negative acknowledgement which includes information about a generation time as a time when the requested data are generated in a case where the data that are requested by the received request packet are absent in the device.

It should be noted that general or specific embodiments may be implemented as a system, a method, an integrated circuit, a computer program, a storage medium, or any selective combination thereof.

The present disclosure may realize a device, a device management apparatus, a relay apparatus, and a terminal apparatus that facilitate power saving.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
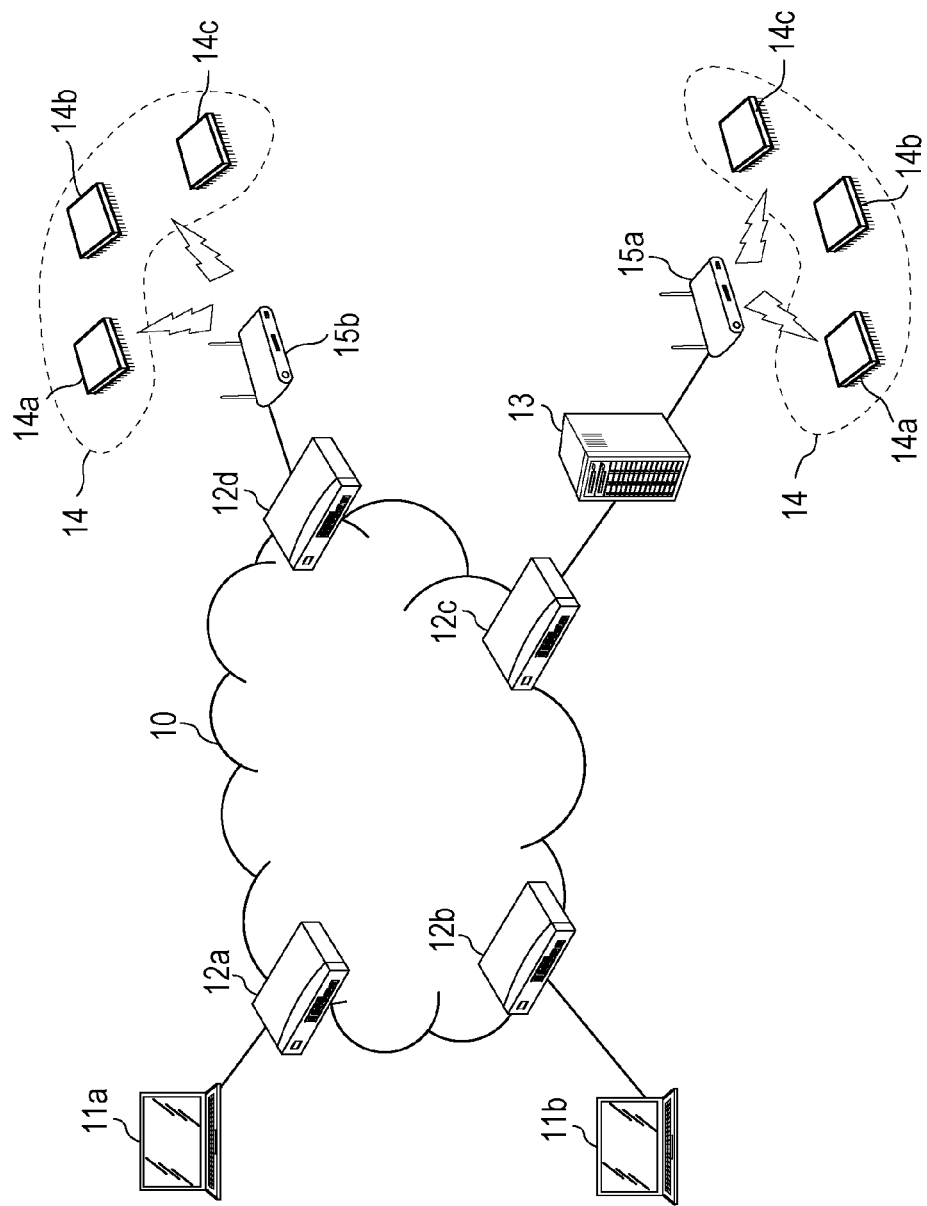
FIG. 1 is a diagram that illustrates one example of a content delivery system in an embodiment.

DETAILED DESCRIPTION (Underlying Knowledge Forming Basis of Present Disclosure)

The underlying knowledge forming basis of the present disclosure will hereinafter be described.

In a CCN, a terminal apparatus of a user sends out a request packet that specifies not the location where the content data are present but the name of the content data themselves to the network so as to obtain the content data. Then, when a content providing apparatus that provides the contents receives the request packet, the content providing apparatus sends out a data packet of the content data that correspond to the name.

A relay apparatus that relays the request packet has path information that is referred to as forwarding information base (FIB) and transfers the request packet transmitted from the terminal apparatus or another relay apparatus to the content providing apparatus in accordance with the path information. Further, the relay apparatus has a request storage unit that is referred to as pending interest table (PIT) and a data storage unit that is referred to as content store and transfers the data packet transmitted from the content providing apparatus or another relay apparatus to the terminal apparatus that transmits the request packet.

Here, in a case where a data packet that includes the name described in the request packet is present in the data storage unit (content store) when the relay apparatus receives the request packet, the relay apparatus transmits the data packet from an interface that receives the request packet. The relay apparatus does not transfer the request packet to the content providing apparatus or another relay apparatus. On the other hand, in a case where the data packet that includes the name described in the received request packet is absent in the data storage unit (content store) and only in a case where information about the request packet that corresponds to the same name as the name described in the request packet is absent in the request storage unit (PIT), the relay apparatus stores, in the request storage unit (PIT), the name described in the request packet and information of the interface that receives the request packet. The relay apparatus then transfers the received request packet to the content providing apparatus or another relay apparatus in accordance with the path information. In a case where the information about the request packet that corresponds to the same name as the name described in the request packet is already present in the request storage unit (PIT), the relay apparatus does not transfer the request packet and stores only the information of the interface that receives the request packet.

Further, when the relay apparatus receives the data packet, the relay apparatus stores the data packet in the data storage unit (content store). However, in a case where the data storage unit (content store) does not have an area to store a new data packet, a data packet that is stored in the data storage unit (content store) for a certain time from the time of storage is deleted from a data storage area (content store).

The relay apparatus replicates the data packet for one or more interfaces that receive plural request packets which have the description of the same name as the name of the data packet in accordance with the information in the request storage unit (PIT) and transfers the replicated data packets via the one or more interfaces. The relay apparatus thereafter deletes the name of the data packet and the information of the interfaces that receive the request packet that matches with the name from the request storage unit (PIT).

The CCN may deliver data by causing the relay apparatus to maximally utilize the request storage unit (PIT) and the data storage unit (content store).

In addition, in the ICN including the CCN, two new kinds of negative acknowledgement packets (packets that indicate negative acknowledgements) are being provided other than the request packet and the data packet. One of the negative acknowledgement packets is a negative acknowledgement packet that indicates loss of a packet and time-out and is a negative acknowledgement packet for notifying congestion on the network and so forth, for example. The other of the negative acknowledgement packets is a negative acknowledgement packet that indicates absence of the content data. That is, the other is a negative acknowledgement packet for notifying the absence of the data to the terminal apparatus that transmits the request in a case where the data that correspond to the name specified for the request packet are absent.

However, even if above U.S. Pat. No. 8,386,622 and the above cited document "Networking Named Content" provide the negative acknowledgement packets that indicate absence of the content data, the terminal apparatus that transmits the request packet and receives the negative acknowledgement packet may only recognize that the terminal apparatus is not able to receive the content data that correspond to the name specified for the request packet. That is, there is a problem that load reduction for a data provider is not taken into consideration and power saving may not be facilitated.

For example, in a case where the data that correspond to the name described in the request packet are absent at the point when the request packet arrives at the data provider, the data provider transmits the negative acknowledgement packet that indicates absence of the content data.

However, in a case where the terminal apparatus that transmits the request packet receives the negative acknowledgement packet that indicates absence of the content data, the terminal apparatus may not determine whether the data are absent because the name described in the request packet is incorrect or the data are not yet generated in the data provider. Thus, when the terminal apparatus receives the negative acknowledgement packet that indicates absence of the content data, the terminal apparatus retransmits the request packet.

This leads to a problem that even in a case where the data provider plans to generate the data after a prescribed time elapses, the data provider repeatedly receives the same request packet while the prescribed time elapses and has to repeatedly respond with the negative acknowledgement packet. That is, there is a problem that the data provider may not attempt power saving by turning into a sleep mode or the like while the data are generated and a processing load of repeatedly responding with the negative acknowledgement packet or the like occurs.

To solve such problems, a device according to one aspect of the present disclosure is a device that is connected with a content centric network, the device including a processor and a non-transitory memory having stored therein instructions which, when executed by the processor, cause the processor to perform operations including: receiving a request packet that requests data which are generated by the device; transmitting the requested data to the network in a case where the data that are requested by the received request packet are present in the device; and transmitting, to the network, a packet that indicates a negative acknowledgement which includes information about a generation time as a time when the requested data are generated in a case where the data that are requested by the received request packet are absent in the device.

This aspect enables a device that facilitates power saving to be realized.

Specifically, the description of the information about the generation time of the data in the negative acknowledgement packet allows the terminal apparatus or the like that transmits the request packet to retransmit the request packet after the time when the data are generated. Accordingly, the device may reduce the number of the negative acknowledgement packets to be transmitted, thereby reduce the processing load, and further facilitate power saving because the device does not have to be started each time but is started simply at the generation time of the data.

Here, the packet that indicates the negative acknowledgement may be a negative acknowledgement (NACK) packet, and the packet that indicates the negative acknowledgement may be a data packet that indicates the negative acknowledgement.

Further, the information about the generation time may be information that indicates the generation time.

Further, the information about the generation time may be information that indicates an expiration time of the packet that indicates the negative acknowledgement based on the generation time.

Further, the information about the generation time may be information that indicates a start time of the device based on the generation time.

Further, the information about the generation time may be information that indicates a time when obtainment of the data is enabled based on the generation time.

Further, to solve the above problems, a device management apparatus according to one aspect of the present disclosure is a device management apparatus that is connected with a content centric network, the device management apparatus including a processor and a non-transitory memory having stored therein instructions which, when executed by the processor, cause the processor to perform operations including: obtaining data that are generated by a device which is connected with the device management apparatus; accumulating the obtained data; receiving a request packet that requests the data which are generated by the device; transmitting the requested data to the network in a case where the data that are requested by the received request packet are accumulated; and transmitting, to the network, a packet that indicates a negative acknowledgement which includes information about a generation time as a time when the requested data are generated in a case where the data that are requested by the received request packet are not accumulated.

This aspect enables a device management apparatus that facilitates power saving to be realized.

Specifically, the description of the information about the generation time of the data in the negative acknowledgement packet allows the terminal apparatus or the like that transmits the request packet to retransmit the request packet after the time when the data are generated. Accordingly, the device management apparatus may reduce the number of the negative acknowledgement packets to be transmitted, thereby reduce the processing load, and further facilitate power saving because the device management apparatus does not have to be started each time but is started simply at the generation time of the data in response to the start of the device.

Further, to solve the above problems, a relay apparatus according to one aspect of the present disclosure is a relay apparatus that is connected with a content centric network and relays packets that include a request packet and a data packet, the relay apparatus including: a processor that receives a packet which indicates a negative acknowledgement which corresponds to a request packet which requests data and that transfers the received packet which indicates the negative acknowledgement; and a memory that stores the packet which is received by the processor and indicates the negative acknowledgement.

This aspect enables a relay apparatus that facilitates power saving to be realized.

Specifically, the transfer of the negative acknowledgement packet that has the description of the information about the generation time of the data in the negative acknowledgement packet allows the terminal apparatus or the like that transmits the request packet to retransmit the request packet after the time when the data are generated. Accordingly, the relay apparatus may reduce the number of the data packets that are transmitted by the data provider such as the device or the device management apparatus and thereby facilitate power saving of the data provider such as the device or the device management apparatus.

Further, the relay apparatus may respond with the negative acknowledgement packet without transferring the request packet to the device as the data provider after the negative acknowledgement packet is stored. Accordingly, the relay apparatus may reduce the number of the data packets that are transmitted by the data provider such as the device or the device management apparatus and thereby facilitate power saving of the data provider such as the device or the device management apparatus.

Further, the packet that indicates the negative acknowledgement may include information about a generation time as a time when the data are generated.

Further, the processor may delete the packet that is stored in the memory and indicates the negative acknowledgement after a prescribed period based on the information about the generation time that is included in the packet which indicates the negative acknowledgement elapses.

Further, in a case where the processor receives the request packet that requests the data in a case where the packet that indicates the negative acknowledgement is stored in the memory, the processor may not transfer the request packet that requests the data but may transmit the packet that indicates the negative acknowledgement which corresponds to the request packet which requests the data and that is stored in the memory to the network.

Further, the packet that indicates the negative acknowledgement may be a NACK packet.

Further, the packet that indicates the negative acknowledgement may be a data packet that indicates a negative acknowledgement.

Further, a terminal apparatus according to one aspect of the present disclosure is a terminal apparatus that is connected with a content centric network, the terminal apparatus including a processor and a non-transitory memory having stored therein instructions which, when executed by the processor, cause the processor to perform operations including: transmitting a request packet that requests data; receiving a packet that indicates a negative acknowledgement which corresponds to the request packet and includes information about a generation time as a time when the data are generated; and retransmitting the request packet after a prescribed time based on the information about the generation time in a case where the packet that indicates the negative acknowledgement is received.

This aspect enables a terminal apparatus that facilitates power saving to be realized.

Specifically, the terminal apparatus that transmits the request packet receives the negative acknowledgement packet that has the description of the information about the generation time of the data in the negative acknowledgement packet and may thereby retransmit the request packet after the time when the data are generated. Accordingly, the terminal apparatus may reduce the number of the packets that are transmitted by the data provider such as the device or the device management apparatus. Further, the terminal apparatus may retransmit the request packet at the generation time of the data. Thus, the terminal apparatus may reduce the number of the request packets to be transmitted, thereby reduce the processing load, and further facilitate power saving because unnecessary transmission of the request packets may be avoided and unnecessary power consumption may be reduced.

Here, the packet that indicates the negative acknowledgement may be a NACK packet, and the packet that indicates the negative acknowledgement may be a data packet that indicates the negative acknowledgement.

Further, a communication method of a device according to one aspect of the present disclosure is a communication method of a device that is connected with a content centric network, the communication method including: receiving a request packet that requests data which are generated by the device; transmitting the requested data to the network in a case where the data that are requested by the request packet which is received in the receiving are present in the device; and transmitting, to the network, a packet that indicates a negative acknowledgement which includes information about a generation time as a time when the requested data are generated in a case where the data that are requested by the request packet which is received in the receiving are absent in the device.

Further, a communication method of a device management apparatus according to one aspect of the present disclosure is a communication method of a device management apparatus that is connected with a content centric network, the communication method including: obtaining data that are generated by a device which is connected with the device management apparatus; accumulating the data that are obtained in the obtaining; receiving a request packet that requests the data which are generated by the device; transmitting the requested data to the network in a case where the data that are requested by the request packet which is received in the receiving are accumulated in the accumulating; and transmitting, to the network, a packet that indicates a negative acknowledgement which includes information about a generation time as a time when the requested data are generated in a case where the data that are requested by the request packet which is received in the receiving are not accumulated in the accumulating.

Further, a communication method of a relay apparatus according to one aspect of the present disclosure is a communication method of a relay apparatus that is connected with a content centric network and relays packets that include a request packet and a data packet, the communication method including: performing reception of a packet that indicates a negative acknowledgement which corresponds to a request packet which requests data and transfer of the received packet that indicates the negative acknowledgement; and storing the packet that is received in the performing and indicates the negative acknowledgement in a memory.

Further, a communication method of a terminal apparatus according to one aspect of the present disclosure is a communication method of a terminal apparatus that is connected with a content centric network, the communication method including: transmitting a request packet that requests data; receiving a packet that indicates a negative acknowledgement which corresponds to the request packet and includes information about a generation time as a time when the data are generated; and retransmitting the request packet in the transmitting after a prescribed time based on the information about the generation time in a case where the packet that indicates the negative acknowledgement is received in the receiving.

A terminal apparatus, a gateway apparatus, a relay apparatus, and so forth according to an embodiment of this disclosure will hereinafter be described in detail with reference to drawings.

It should be noted that general or specific embodiments may be implemented as a system, a method, an integrated circuit, a computer program, a computer-readable recording medium such as a CD-ROM, or any selective combination thereof.

Embodiment

[Configuration of Content Delivery System]

FIG. 1 is a diagram that illustrates one example of a content delivery system in an embodiment.

The content delivery system illustrated in FIG. 1 includes plural terminal apparatuses 11, plural relay apparatuses 12, and a device management apparatus 13, which are connected together via a CCN network 10. Here, a terminal apparatus 11a and a terminal apparatus 11b are examples of the terminal apparatus 11, and a relay apparatus 12a, a relay apparatus 12b, a relay apparatus 12c, and a relay apparatus 12d are examples of the relay apparatus 12.

The CCN network 10 is one example of a content centric network.

The relay apparatus 12 is connected with the CCN network 10 and relays a request packet and a data packet.

The terminal apparatus 11 is connected with the CCN network 10. The terminal apparatus 11 transmits the request packet that has the description of the name of a content data and receives the data packet that includes the content data via the CCN network 10. In this embodiment, as illustrated in FIG. 1, the terminal apparatus 11a and the terminal apparatus 11b are connected with the CCN network 10 by the relay apparatus 12a and the relay apparatus 12b and may exchange the request packet for the data packet. The content data will hereinafter be denoted as data.

The device management apparatus 13 is connected with the CCN network 10 and manages a device 14. In this embodiment, it is desired that the device management apparatus 13 perform power saving. As illustrated in FIG. 1, the device management apparatus 13 is connected with the device 14 via a base station 15a and may obtain and manage data of the device 14. Further, the device management apparatus 13 is connected with the CCN network 10 via the relay apparatus 12c. When the device management apparatus 13 receives the request packet, the device management apparatus 13 sends out the data packet of data of the device 14 that corresponds to the name of a content which is included in the request packet.

The device 14 is, for example, at least one of sensor devices 14a, 14b, and 14c which have a limit of a processing capability or for which power saving is desired and periodically generates the data. The device 14 is connected with the base station 15. In this embodiment, as illustrated in FIG. 1, the device 14 may be managed by the device management apparatus 13 and transmit the generated data to the device management apparatus 13. Further, the device 14 may be connected with the relay apparatus 12d via the base station 15b. In this case, when the device 14 receives the request packet via the base station 15, the device 14 sends out the data packet of the data that correspond to the name of the content which is included in the request packet and that are generated by the device 14 to the base station 15.

[Device Configuration]

Figure 2:
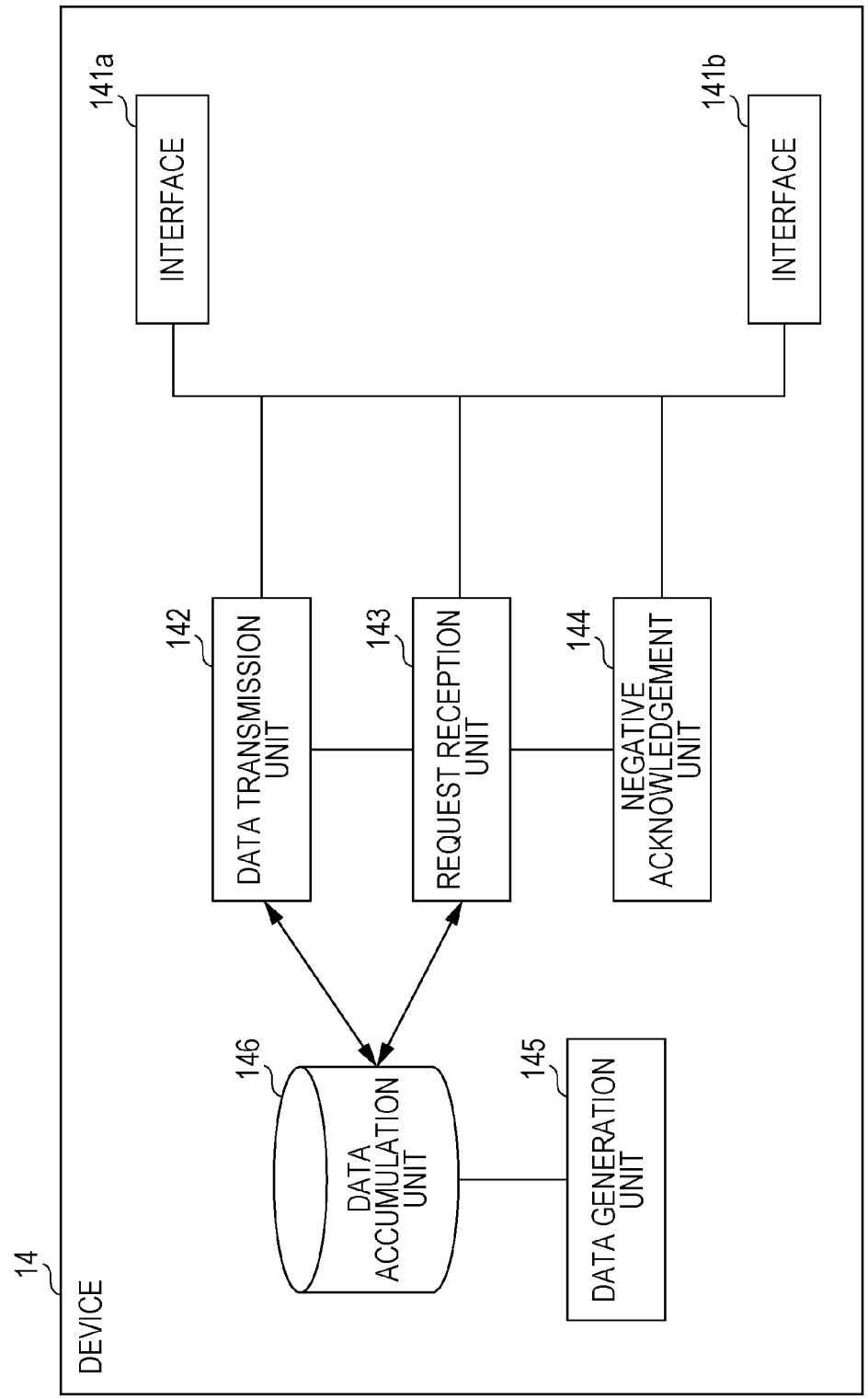
FIG. 2 is a diagram that illustrates one example of a specific configuration of a device in the embodiment.

FIG. 2 is a diagram that illustrates one example of a specific configuration of the device in the embodiment.

The device 14 illustrated in FIG. 2 is a device that is connected with the CCN network 10 and includes one or more interfaces 141 (interfaces 141a and 141b in FIG. 2), a data transmission unit 142, a request reception unit 143, a negative acknowledgement unit 144, a data generation unit 145, and a data accumulation unit 146.

In this embodiment, the device 14 may start when the request packet is received or at each prescribed time. Further, the device 14 may start in response to a data obtainment request from the device management apparatus 13. This allows the device 14 to perform power saving.

The request reception unit 143 receives the request packet that requests the data generated by the device 14.

The data transmission unit 142 transmits the requested data to the CCN network 10 in a case where the data requested by the request packet that is received by the request reception unit 143 are present in the device 14. The data transmission unit 142 may generate the data when the device 14 starts at a prescribed time for power saving and transmit the generated data to the device management apparatus 13.

The negative acknowledgement unit 144 transmits a packet that indicates the negative acknowledgement (negative acknowledgement packet) which includes information about a generation time as a time when the requested data are generated to the CCN network 10 in a case where the data requested by the request packet that is received by the request reception unit 143 are absent in the device 14.

Here, the negative acknowledgement packet may be a negative acknowledgement (NACK) packet or may be a data packet that indicates the negative acknowledgement (hereinafter denoted as negative acknowledgement data packet). Further, the information about the generation time may be information that indicates the generation time as the time when the requested data are generated or may be information that indicates an expiration time of the negative acknowledgement packet based on the generation time, for example. Further, the information about the generation time may be information that indicates a start time of the device 14 based on the generation time or may be information that indicates the time when obtainment of data is enabled based on the generation time.

In this embodiment, in a case where the data that correspond to the name described in the request packet are absent at the point when the request reception unit 143 receives the request packet, the negative acknowledgement unit 144 transmits the negative acknowledgement packet that designates the name. Here, in a case where it is known that the data generation unit 145 generates the data that correspond to the request packet after a prescribed time elapses, the negative acknowledgement unit 144 describes generation time information that indicates the time when the data that correspond to the request are generated in the negative acknowledgement packet. The negative acknowledgement unit 144 may further set the expiration time of the negative acknowledgement packet in accordance with the generation time information.

The data accumulation unit 146 accumulates the data generated by the data generation unit 145.

The data generation unit 145 generates the data and accumulates the data in the data accumulation unit 146. In this embodiment, the data generation unit 145 generates the data at the prescribed time when the device 14 starts. The device 14 may start when the request packet is received.

[Configuration of Device Management Apparatus]

Figure 3:
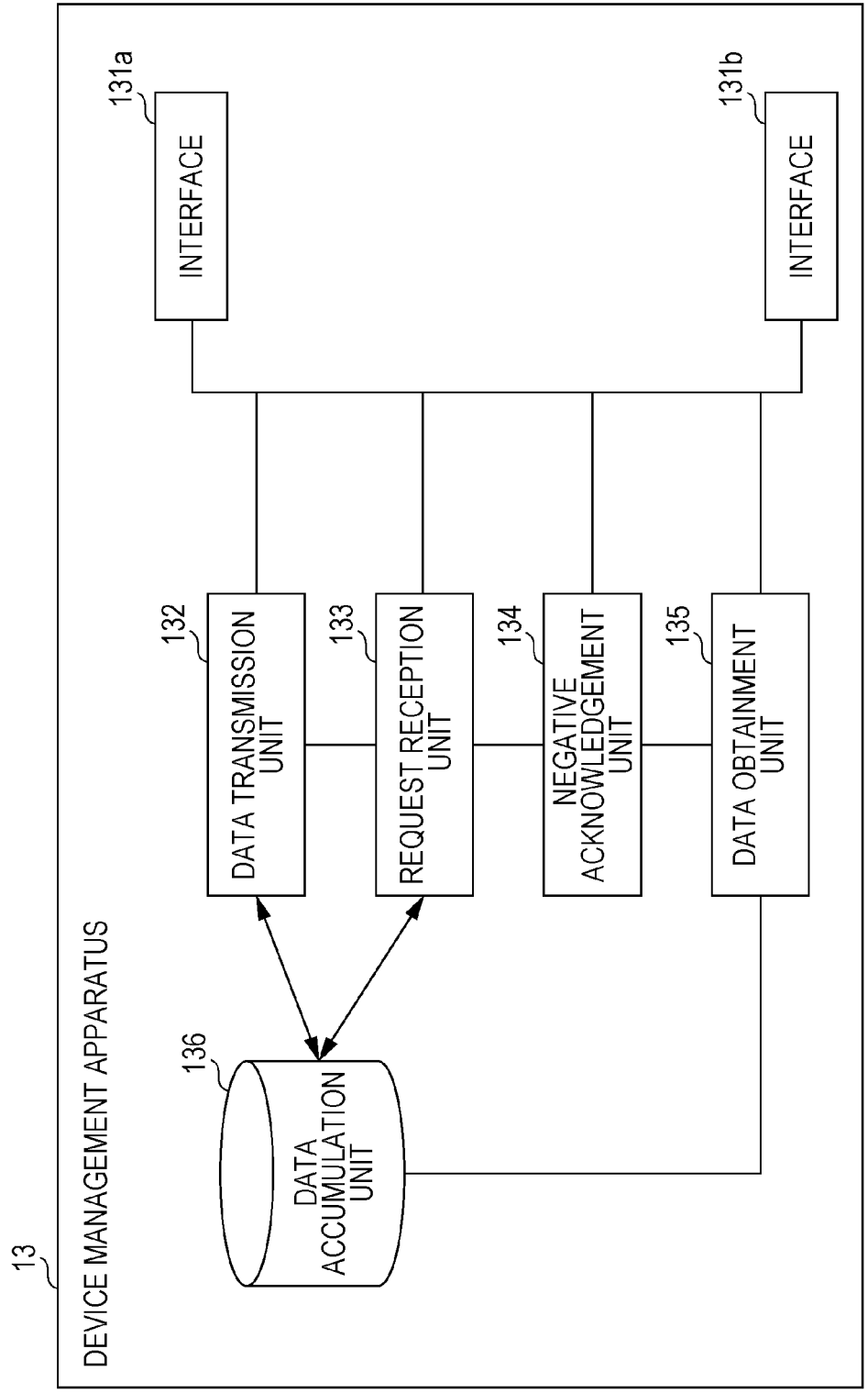
FIG. 3 is a diagram that illustrates one example of a specific configuration of a device management apparatus in the embodiment.

FIG. 3 is a diagram that illustrates one example of a specific configuration of the device management apparatus in the embodiment.

The device management apparatus 13 illustrated in FIG. 3 includes one or more interfaces 131 (interfaces 131a and 131b in FIG. 3), a data transmission unit 132, a request reception unit 133, a negative acknowledgement unit 134, a data obtainment unit 135, and a data accumulation unit 136.

In this embodiment, the device management apparatus 13 is connected with the CCN network 10 and manages the devices 14 (the sensor devices 14a to 14c) that are connected via the base station 15a.

The request reception unit 133 receives the request packet that requests the data generated by the device 14.

The data obtainment unit 135 obtains the data generated by the device 14 that is managed by the device management apparatus 13. In this embodiment, the data obtainment unit 135 obtains the data of the device 14 that is managed through the base station 15 (the base station 15a in FIG. 1). The data obtainment unit 135 may in advance obtain (collect) the data of the device 14 and thereby accumulate the data in the data accumulation unit 136 or may obtain the data of the device 14 when the request reception unit 133 receives the request packet and thereby accumulate the data in the data accumulation unit 136.

The data accumulation unit 136 accumulates the data obtained by the data obtainment unit 135.

The data transmission unit 132 transmits the requested data to the CCN network 10 in a case where the data requested by the request packet that is received by the request reception unit 133 are present in the data accumulation unit 136. In this embodiment, the data transmission unit 132 transmits the requested data as a data packet.

The negative acknowledgement unit 134 transmits the negative acknowledgement packet (the packet that indicates the negative acknowledgement) which includes the information about the generation time as the time when the requested data are generated to the CCN network 10 in a case where the data requested by the request packet that is received by the request reception unit 133 are absent in the data accumulation unit 136.

Here, the negative acknowledgement packet may be the NACK packet or may be the negative acknowledgement data packet. Further, the information about the generation time may be information that indicates the generation time as the time when the device 14 generates the requested data or may be information that indicates the expiration time of the negative acknowledgement packet based on the generation time, for example. Further, the information about the generation time may be information that indicates the start time of the device 14 based on the generation time or may be information that indicates the time when obtainment of data is enabled based on the generation time.

In this embodiment, in a case where the data that correspond to the name described in the request packet are absent in the data accumulation unit 136 at the point when the request reception unit 133 receives the request packet, the negative acknowledgement unit 134 transmits the negative acknowledgement packet that designates the name. Here, in a case where it is known that the device 14 generates the data that correspond to the request packet after a prescribed time elapses, the negative acknowledgement unit 134 describes the generation time information that indicates the time when the data that correspond to the request are generated in the negative acknowledgement packet. The negative acknowledgement unit 134 may further set the expiration time of the negative acknowledgement packet in accordance with the generation time information.

[Configuration of Relay Apparatus]

Figure 4:
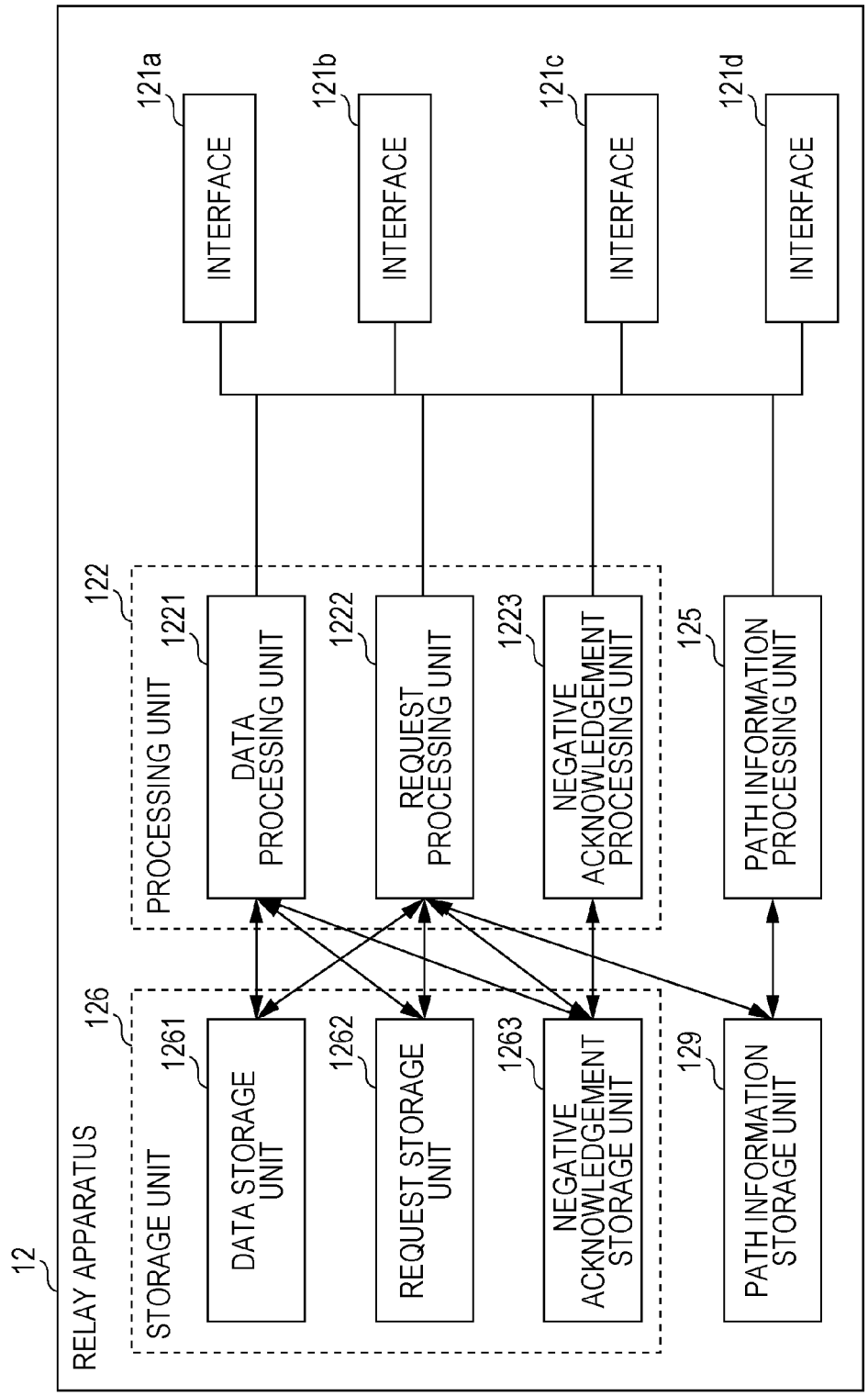
FIG. 4 is a diagram that illustrates one example of a specific configuration of a relay apparatus in the embodiment.

FIG. 4 is a diagram that illustrates one example of a specific configuration of the relay apparatus in the embodiment.

The relay apparatus 12 illustrated in FIG. 4 is a relay apparatus that is connected with the CCN network 10 and relays packets that include the request packet and the data packet. The relay apparatus 12 includes one or more interfaces 121 (interfaces 121a, 121b, 121c, and 121d in FIG. 4), a processing unit 122, a path information processing unit 125, a storage unit 126, and a path information storage unit 129. In this embodiment, the processing unit 122 includes a data processing unit 1221, a request processing unit 1222, and a negative acknowledgement processing unit 1223. The storage unit 126 includes a data storage unit 1261, a request storage unit 1262, and a negative acknowledgement storage unit 1263.

The path information storage unit 129 stores path information that is referred to as forwarding information base (FIB). The path information processing unit 125 performs a process of storing the path information in the path information storage unit 129. The relay apparatus 12 transfers the request packet transmitted from the terminal apparatus 11, the device management apparatus 13, the devices 14, and another relay apparatus in accordance with the path information stored in the path information storage unit 129.

The processing unit 122 receives the negative acknowledgement packet that corresponds to the request packet which requests the data and that includes the information about the generation time as the time when the data are generated and transfers the received negative acknowledgement packet. Further, the processing unit 122 deletes the negative acknowledgement packet stored in the storage unit 126 after a prescribed time based on the information about the generation time that is included in the negative acknowledgement packet elapses. The processing unit 122 does not transfer the request packet that requests the data in a case where the negative acknowledgement packet is stored in the storage unit 126 and the processing unit 122 receives the request packet that requests the data but transmits the negative acknowledgement packet that corresponds to the request packet which requests the data and that is stored in the storage unit 126 to the CCN network 10. Here, the negative acknowledgement packet may be the NACK packet or may be a negative acknowledgement data packet.

A description will be made in detail below.

The negative acknowledgement processing unit 1223 receives the negative acknowledgement packet that corresponds to the request packet which requests the data and that includes the information about the generation time as the time when the data are generated and transfers the received negative acknowledgement packet. Further, the negative acknowledgement processing unit 1223 deletes the negative acknowledgement packet stored in the storage unit 126 after a prescribed time based on the information about the generation time that is included in the negative acknowledgement packet elapses.

In this embodiment, when the negative acknowledgement processing unit 1223 receives the NACK packet, for example, the negative acknowledgement processing unit 1223 obtains information of the interface 121 that receives the request packet which corresponds to the same name as the name described in the received NACK packet from the request storage unit 1262. Then, the negative acknowledgement processing unit 1223 transmits the received NACK packet from the interface 121 whose information is obtained. In addition, the negative acknowledgement processing unit 1223 stores information of the received NACK packet in the negative acknowledgement storage unit 1263. Here, it is sufficient that the information stored in the negative acknowledgement storage unit 1263 is information that is necessary for reconfiguring the NACK packet and includes the name described in the NACK packet.

Meanwhile, when the negative acknowledgement processing unit 1223 receives the negative acknowledgement data packet, for example, the negative acknowledgement processing unit 1223 obtains information of the interface 121 that receives the request packet which corresponds to the same name as the name described in the received negative acknowledgement data packet from the request storage unit 1262. Then, the negative acknowledgement processing unit 1223 transmits the received negative acknowledgement data packet from the interface 121 whose information is obtained. In addition, the negative acknowledgement processing unit 1223 stores information of the received negative acknowledgement data packet in the negative acknowledgement storage unit 1263. Here, it is sufficient that the information stored in the negative acknowledgement storage unit 1263 is information that is necessary for reconfiguring the negative acknowledgement data packet and includes the name described in the negative acknowledgement data packet. A description will be made below also on the assumption that the negative acknowledgement packet is the negative acknowledgement data packet or the NACK packet.

Further, in a case where an expiration time is set for the received negative acknowledgement packet, the negative acknowledgement processing unit 1223 stores the information of the negative acknowledgement packet in the negative acknowledgement storage unit 1263 while setting a storage expiration time based on the expiration time of the negative acknowledgement packet. The negative acknowledgement processing unit 1223 deletes the negative acknowledgement packet whose storage expiration time has elapsed from the negative acknowledgement storage unit 1263.

Further, in a case where the information of the negative acknowledgement packet that includes the same name as the name described in the received negative acknowledgement packet is stored in the negative acknowledgement storage unit 1263, the negative acknowledgement processing unit 1223 may update information of an old negative acknowledgement packet that is already stored in the negative acknowledgement storage unit 1263. Further, in a case where the negative acknowledgement storage unit 1263 is running short of an area to store a newly received negative acknowledgement packet, the negative acknowledgement processing unit 1223 may delete the information of an arbitrary negative acknowledgement packet from the negative acknowledgement storage unit 1263 and thereby enable storage of a newly received negative acknowledgement packet.

The request processing unit 1222 does not transfer the request packet that requests the data in a case where the negative acknowledgement packet is stored in the storage unit 126 and the request packet that requests the data is received but transmits the negative acknowledgement packet that corresponds to the request packet which requests the data and that is stored in the storage unit 126 (the negative acknowledgement storage unit 1263) to the CCN network 10.

In this embodiment, when the request processing unit 1222 receives the request packet, the request processing unit 1222 confirms whether the data packet that corresponds to the name described in the request packet is stored in the data storage unit 1261. In a case where the corresponding data packet is stored in the data storage unit 1261, the request processing unit 1222 causes the data processing unit 1221 to transmit the data packet from the interface 121 that receives the request packet.

Further, in a case where the negative acknowledgement packet that corresponds to the name described in the request packet is stored in the negative acknowledgement storage unit 1263, the request processing unit 1222 transmits the negative acknowledgement packet from the interface that receives the request packet. When the request processing unit 1222 receives the request packet, for example, the request processing unit 1222 may first confirm whether the data packet that corresponds to the name described in the request packet is stored in the data storage unit 1261 and then confirm whether the negative acknowledgement packet that corresponds to the name described in the request packet is stored in the negative acknowledgement storage unit 1263, and vice versa. The order of confirmations about the data storage unit 1261 and the negative acknowledgement storage unit 1263 may arbitrarily set.

In a case where the data packet or the negative acknowledgement packet that corresponds to the name described in the request packet is absent in the data storage unit 1261 or the negative acknowledgement storage unit 1263 and only in a case where the information about the request packet that corresponds to the same name as the name described in the request packet is absent in the request storage unit 1262, the request processing unit 1222 causes the request storage unit 1262 to store the name described in the request packet and the information of the interface 121 that receives the request packet and transmits the request packet from one or more interfaces 121 to the CCN network 10 based on the path information stored in the path information storage unit 129 and the name.

When the data processing unit 1221 receives the data packet, the data processing unit 1221 obtains information of the interface 121 that receives the request packet which corresponds to the same name as the name described in the received data packet from the request storage unit 1262. Then, the data processing unit 1221 transmits the received data packet from the interface 121 whose information is obtained to the CCN network 10. In addition, the data processing unit 1221 stores information of the received data packet in the data storage unit 1261.

In a case where the data processing unit 1221 receives the data packet and the negative acknowledgement data packet that includes the same name as the name described in the data packet is stored in the data storage unit 1261, the data processing unit 1221 may delete the negative acknowledgement data packet stored in the data storage unit 1261 after transmission of the received data packet to the CCN network 10. Similarly, in a case where the data processing unit 1221 receives the data packet and the information of the NACK packet that includes the same name as the name described in the data packet is stored in the negative acknowledgement storage unit 1263, the data processing unit 1221 may delete the information of the NACK packet stored in the negative acknowledgement storage unit 1263 after transmission of the received data packet to the CCN network 10.

Further, in a case where an expiration time is set for the negative acknowledgement data packet that is received by the negative acknowledgement processing unit 1223, the data processing unit 1221, instead of the negative acknowledgement processing unit 1223, may delete the negative acknowledgement data packet whose storage expiration time has passed from the data storage unit 1261.

Further, the data processing unit 1221 may receive the negative acknowledgement data packet instead of the negative acknowledgement processing unit 1223, and the negative acknowledgement processing unit 1223 may perform the subsequent processes. In this case, in a case where the information of the negative acknowledgement data packet that has the description of the same name as the name described in the received negative acknowledgement data packet is stored in the data storage unit 1261, the data processing unit 1221 may further update the information of the old negative acknowledgement data packet that is already stored in the data storage unit 1261. Further, in a case where the data storage unit 1261 is running short of an area to store a newly received data packet, the data processing unit 1221 may delete the information of an arbitrary data packet that may include the negative acknowledgement data packet from the data storage unit 1261 and thereby enable storage of the information of a newly received data packet.

The storage unit 126 includes the data storage unit 1261, the request storage unit 1262, and the negative acknowledgement storage unit 1263 and stores the negative acknowledgement packet that is received by the processing unit 122.

The request storage unit 1262 stores the pending interest table (PIT) and the interface 121 that receives the request packet.

The data storage unit 1261 stores the data packet that is received by the data processing unit 1221.

The negative acknowledgement storage unit 1263 stores the negative acknowledgement packet. In this embodiment, the negative acknowledgement storage unit 1263 stores information of the NACK packet and the negative acknowledgement data packet that are received by the negative acknowledgement processing unit 1223.

[Configurations of Terminal Apparatus]

Figure 5:
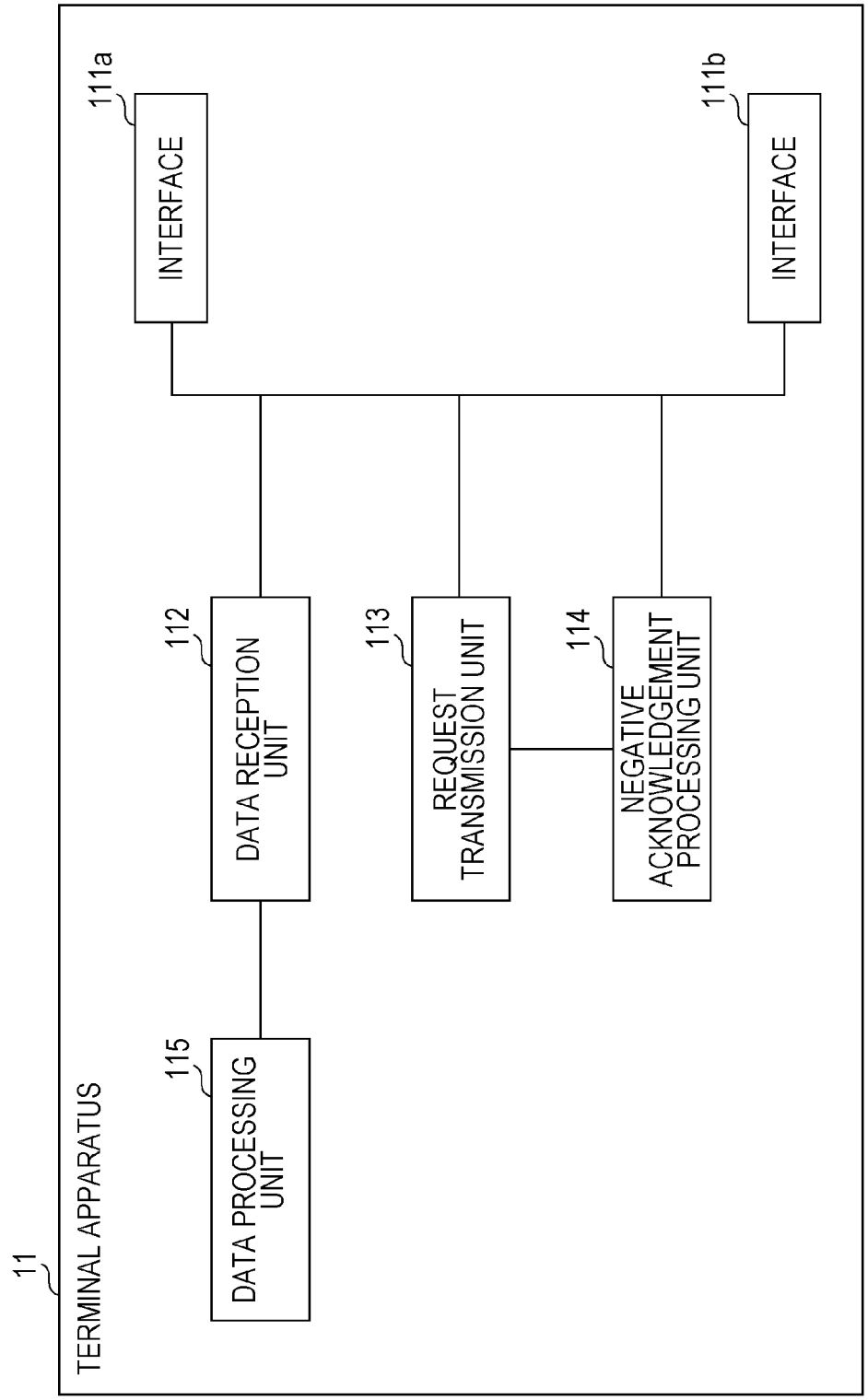
FIG. 5 is a diagram that illustrates one example of a specific configuration of a terminal apparatus in the embodiment.

FIG. 5 is a diagram that illustrates one example of a specific configuration of the terminal apparatus in the embodiment.

The terminal apparatus 11 illustrated in FIG. 5 is a terminal apparatus that is connected with the CCN network 10 and includes one or more interfaces 111 (interfaces 111*a* and 111*b* in FIG. 5), a data reception unit 112, a request transmission unit 113, a negative acknowledgement processing unit 114, and a data processing unit 115.

The data reception unit 112 receives the data packet that corresponds to the request packet.

The data storage unit 115 performs processes such as playing back the data packet that is received by the data reception unit 112.

The request transmission unit 113 transmits the request packet that requests the data. In this embodiment, the request transmission unit 113 transmits the request packet that has the description of the name which corresponds to the data to be obtained. The transmitted request packet is transferred toward the device 14 or the device management apparatus 13 via one or plural relay apparatuses 12 (for example, the relay apparatuses 12*a* to 12*d* in FIG. 1) on the CCN network 10. In a case where the data packet that corresponds to the request packet is present in the storage unit 126 (the data storage unit 1261) of the relay apparatus 12, the data packet is transmitted from the relay apparatus 12 and delivered to the terminal apparatus 11. In a case where the data packet that corresponds to the request packet is absent in any of the relay apparatuses 12, the request packet is delivered to the above-described device 14 or the device management apparatus 13.

The negative acknowledgement processing unit 114 receives the negative acknowledgement packet that corresponds to the request packet and that includes the information about the generation time as the time when the requested data are generated. In a case where the negative acknowledgement processing unit 114 receives the negative acknowledgement packet, the negative acknowledgement processing unit 114 causes the request transmission unit 113 to retransmit the request packet after a prescribed time based on the information about the generation time. Here, the negative acknowledgement packet may be the NACK packet or may be the negative acknowledgement data packet. For example, in a case where the negative acknowledgement processing unit 114 receives the negative acknowledgement packet that corresponds to the request packet and the negative acknowledgement packet includes the generation time information that indicates the time when the requested data are generated, the negative acknowledgement processing unit 114 causes the request transmission unit 113 to again transmit the request packet at the generation time or after the generation time.

[Operation of Device]

An operation of the device 14 configured as described above will next be described.

Figure 6:
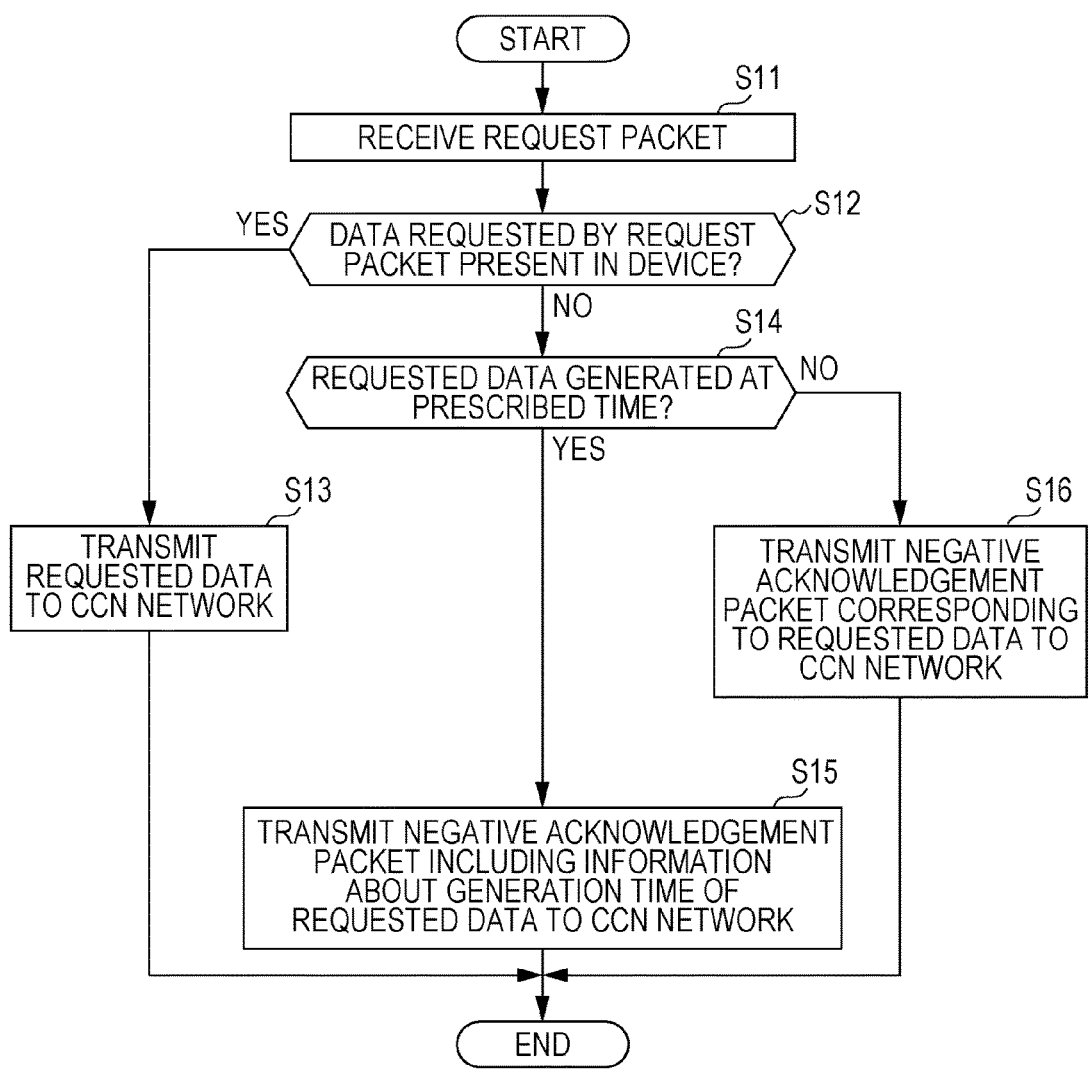
FIG. 6 is a flowchart that illustrates an operation of the device in the embodiment.

FIG. 6 is a flowchart that illustrates an operation of the device in the embodiment. FIG. 6 illustrates the operation to transmission of the negative acknowledgement packet, which is a characteristic operation of the device 14.

The device 14 (the request reception unit 143) first receives the request packet that requests the data generated by the device 14 (the data generation unit 145) (step S11). In this embodiment, the request reception unit 143 receives the request packet that requests the data generated by the data generation unit 145.

The device 14 next confirms whether the data that are requested by the request packet received in step S11 are present in the device 14 (step S12).

In a case where the data that are requested by the request packet received in step S11 are present in the device 14 (Yes in step S12), the device 14 transmits the requested data to the CCN network 10 (step S13). In this embodiment, in a case where the data that are request by the received request packet are accumulated in the data accumulation unit 146, the data transmission unit 142 transmits the requested data that are accumulated in the data accumulation unit 146 to the CCN network 10.

On the other hand, in a case where the data that are requested by the request packet received in step S11 are absent in the device 14 (No in step S12), the device 14 confirms whether the data requested by the request packet are generated after a prescribed time (step S14).

In a case where the data requested by the request packet are generated after the prescribed time in step S14 (Yes in step S14), the device 14 transmits the negative acknowledgement packet that includes the information about the generation time as the time when the requested data are generated to the CCN network 10 (step S15). In this embodiment, because the data requested by the received request packet are not accumulated in the data accumulation unit 146, the negative acknowledgement unit 144 transmits the negative acknowledgement packet that includes the information about the generation time as the time when the requested data are generated to the CCN network 10.

On the other hand, in a case where the requested data are not generated in step S14 (No in step S14), the device 14 transmits the negative acknowledgement packet that corresponds to the requested data to the CCN network 10 (step S16).

As described above, in a case where the data that are requested by the received request packet are absent in the device 14, the device 14 describes the information about the generation time of the data in the negative acknowledgement packet and may thereby cause the terminal apparatus or the like that transmits the request packet to retransmit the request packet after the time when the data are generated. Accordingly, the device 14 may reduce the number of the negative acknowledgement packets to be transmitted, thereby reduce the processing load, and further facilitate power saving because the device 14 does not have to be started each time but is started simply at the generation time of the data.

[Operation of Device Management Apparatus]

An operation of the device management apparatus 13 configured as described above will next be described.

Figure 7:
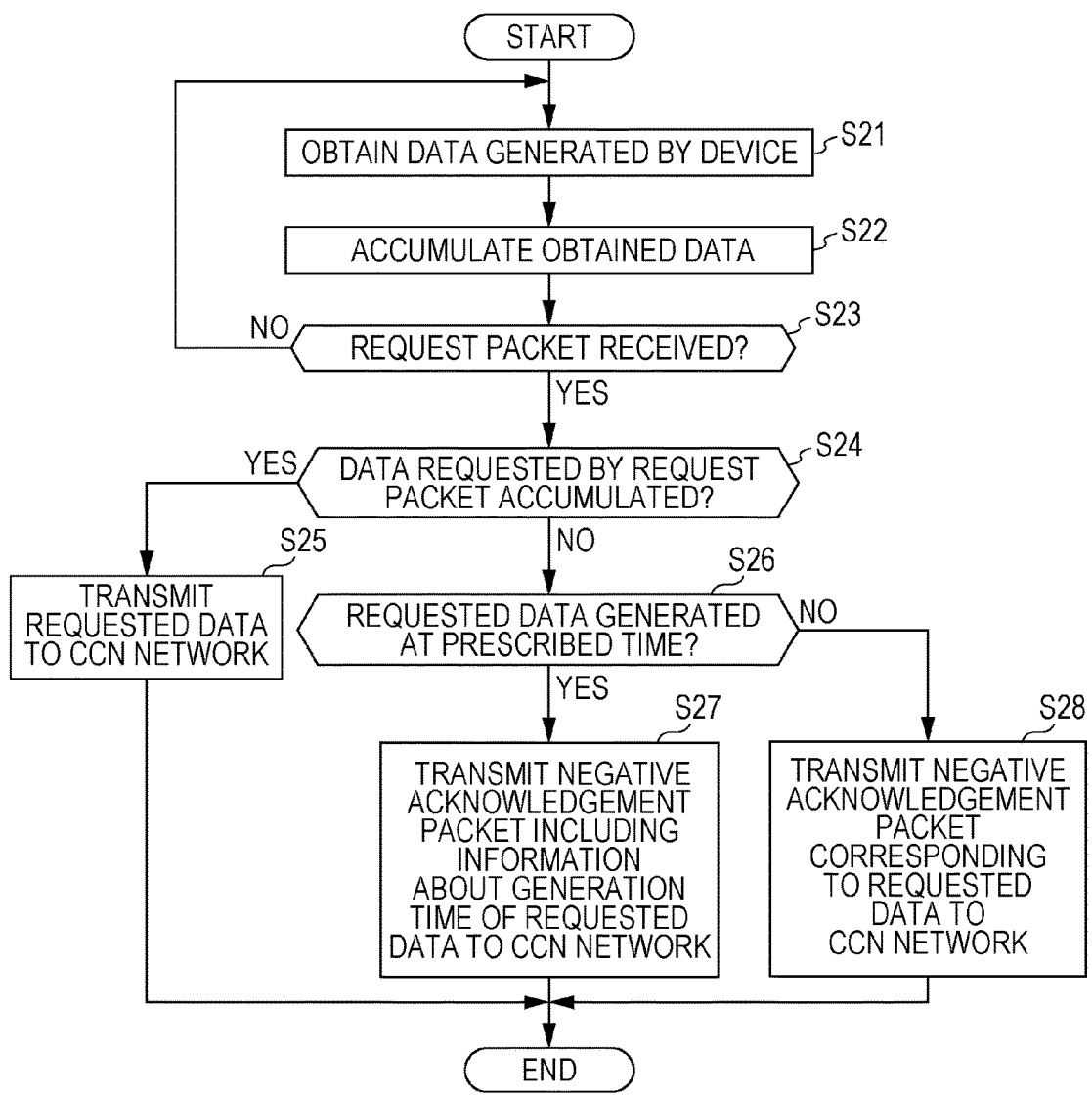
FIG. 7 is a flowchart that illustrates an operation of the device management apparatus in the embodiment.

FIG. 7 is a flowchart that illustrates an operation of the device management apparatus in the embodiment. FIG. 7 illustrates the operation to transmission of the negative acknowledgement packet, which is a characteristic operation of the device management apparatus 13.

The device management apparatus 13 first obtains the data generated by the device 14 that is connected with the device management apparatus 13 (step S21). In this embodiment, the data obtainment unit 135 obtains the data generated by the device 14.

The device management apparatus 13 next accumulates the data obtained in step S21 (step S22). In this embodiment, the data obtainment unit 135 accumulates the obtained data that are generated by the device 14 in the data accumulation unit 136.

The device management apparatus 13 next confirms whether the request packet is received (step S23). Here, in a case where the device management apparatus 13 confirms that the request packet is not received (No in step S23), the device management apparatus 13 returns to the process of step S21.

On the other hand, in a case where the device management apparatus 13 confirms that the request packet is received (Yes in step S23), the device management apparatus 13 progresses to next step S24. In this embodiment, the request reception unit 133 receives the request packet that requests the data generated by the device 14.

In a case where the data that are requested by the request packet received in step S23 are accumulated in step S22 (Yes in step S24), the device management apparatus 13 next transmits the requested data to the CCN network 10 (step S25).

On the other hand, in a case where the data that are requested by the request packet received in step S23 are not accumulated (No in step S24), the device management apparatus 13 confirms whether the data requested by the request packet are generated after a prescribed time (step S26).

In a case where the data requested by the request packet are generated after the prescribed time in step S26 (Yes in step S26), the device management apparatus 13 transmits the negative acknowledgement packet that includes the information about the generation time as the time when the requested data are generated to the CCN network 10 (step S27). In this embodiment, in a case where the data that are requested by the request packet received by the request reception unit 133 are not accumulated in the data accumulation unit 136, the negative acknowledgement unit 134 transmits the negative acknowledgement packet that includes the information about the generation time as the time when the requested data are generated to the CCN network 10.

On the other hand, in a case where the requested data are not generated in step S26 (No in step S26), the device management apparatus 13 transmits the negative acknowledgement packet that corresponds to the requested data to the CCN network 10 (step S28).

As described above, the device management apparatus 13 describes the information about the generation time of the data in the negative acknowledgement packet and may thereby cause the terminal apparatus or the like that transmits the request packet to retransmit the request packet after the time when the data are generated. Accordingly, the device management apparatus 13 may reduce the number of the negative acknowledgement packets to be transmitted, thereby reduce the processing load, and further facilitate power saving because the device management apparatus 13 does not have to be started each time but is started simply at the generation time of the data in response to the start of the device 14.

[Operation of Relay Apparatus]

An operation of the relay apparatus 12 configured as described above will next be described.

Figure 8:
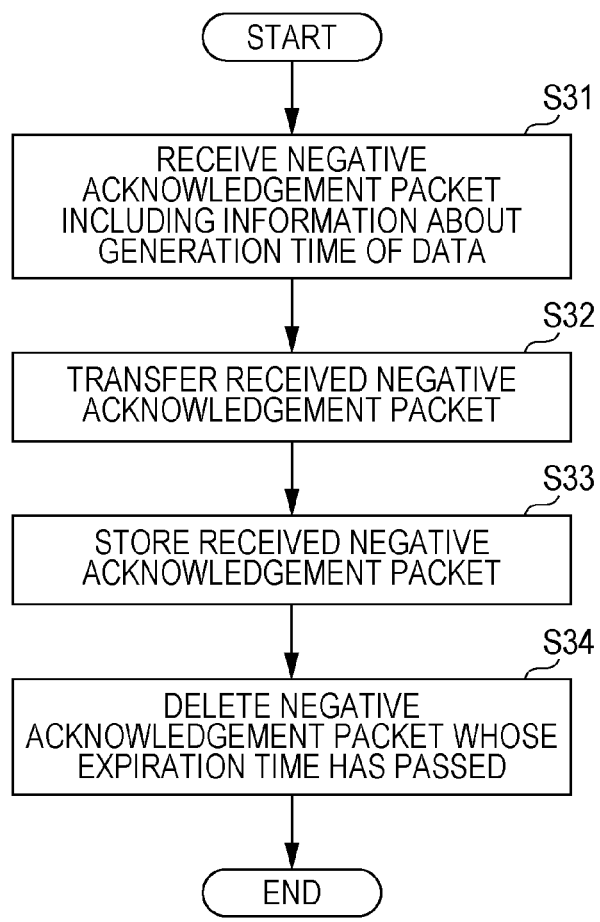
FIG. 8 is a flowchart that illustrates an operation of the relay apparatus in the embodiment.

FIG. 8 is a flowchart that illustrates an operation of the relay apparatus in the embodiment. FIG. 8 illustrates the operation to storage of the negative acknowledgement packet, which is a characteristic operation of the relay apparatus 12.

First, it is assumed that in step S31, the relay apparatus 12 receives the negative acknowledgement packet that corresponds to the request packet which requests the data and that includes the information about the generation time as the time when the data are generated. In this embodiment, the processing unit 122 (the negative acknowledgement processing unit 1223) receives the negative acknowledgement packet.

The relay apparatus 12 next transfers the received negative acknowledgement packet (step S32). In this embodiment, the processing unit 122 (the negative acknowledgement processing unit 1223) transfers the received negative acknowledgement packet.

The relay apparatus 12 next stores the negative acknowledgement packet received in step S31 (step S33). In this embodiment, the processing unit 122 (the negative acknowledgement processing unit 1223) stores the negative acknowledgement packet in the storage unit 126 (the negative acknowledgement storage unit 1263).

Further, the relay apparatus 12 deletes the negative acknowledgement packets whose expiration times have passed among the stored negative acknowledgement packets (step S34).

As described above, the relay apparatus 12 transfers the negative acknowledgement packet that has the description of the information about the generation time of the data in the negative acknowledgement packet and may thereby cause the terminal apparatus 11 that transmits the request packet to retransmit the request packet after the time when the data are generated. Accordingly, the relay apparatus 12 may reduce the number of the negative acknowledgement packets that are transmitted by the data provider such as the device 14 or the device management apparatus 13 and thereby facilitate power saving of the data provider such as the device 14 or the device management apparatus 13.

Further, the relay apparatus 12 may respond with the negative acknowledgement packet without transferring the request packet to the device as the data provider after the negative acknowledgement packet is stored. Accordingly, the relay apparatus 12 may further reduce the number of the negative acknowledgement packets that are transmitted by the data provider such as the device 14 or the device management apparatus 13 and thereby facilitate power saving of the data provider such as the device 14 or the device management apparatus 13.

[Operation of Terminal Apparatus]

An operation of the terminal apparatus 11 configured as described above will next be described.

Figure 9:
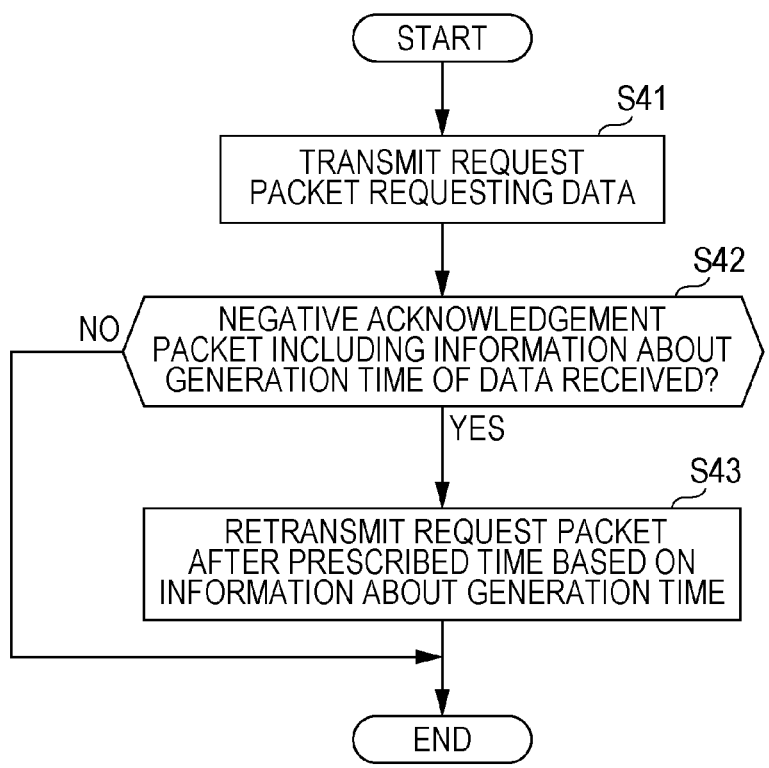
FIG. 9 is a flowchart that illustrates an operation of the terminal apparatus in the embodiment.

FIG. 9 is a flowchart that illustrates an operation of the terminal apparatus in the embodiment. FIG. 9 illustrates the operation to retransmission of the request packet, which is a characteristic operation of the terminal apparatus 11.

The terminal apparatus 11 first transmits the request packet that requests the data (step S41). In this embodiment, the terminal apparatus 11 receives the negative acknowledgement packet.

Next, in a case where the terminal apparatus 11 receives the negative acknowledgement packet that corresponds to the request packet and that includes the information about the generation time as the time when the data are generated (Yes in step S42), the terminal apparatus 11 retransmits the request packet after a prescribed time based on the information about the generation time (step S43).

In step S42, in a case where the terminal apparatus 11 receives the negative acknowledgement packet that corresponds to the request packet and that does not include the information about the generation time as the time when the data are generated (No in step S42), the terminal apparatus 11 finishes the process.

As described above, the terminal apparatus 11 that transmits the request packet receives the negative acknowledgement packet that has the description of the information about the generation time of the data in the negative acknowledgement packet and may thereby retransmit the request packet after the time when the data are generated. Accordingly, the terminal apparatus 11 may reduce the number of the negative acknowledgement packets that are transmitted by the device 14 or the device management apparatus 13. Further, the terminal apparatus 11 may retransmit the request packet at the generation time of the data. Thus, the terminal apparatus 11 may reduce the number of the request packets to be transmitted, thereby reduce the processing load, and further facilitate power saving because unnecessary transmission of the request packets may be avoided and unnecessary power consumption may be reduced.

[Operation of Content Delivery System]

Figure 10:
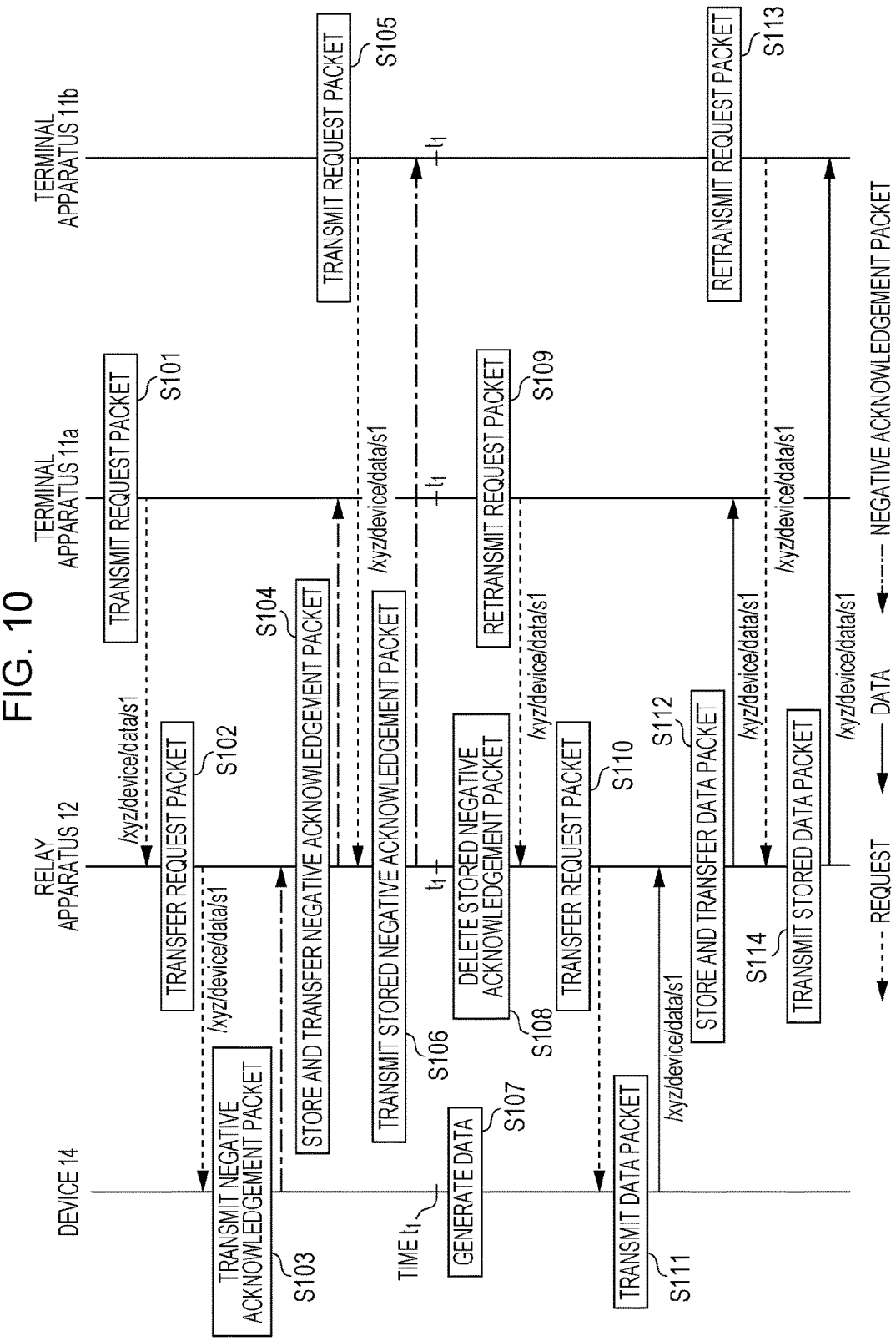
FIG. 10 is a sequence that illustrates a process flow of the content delivery system in the embodiment.

FIG. 10 is a sequence that illustrates a process flow of the content delivery system in the embodiment. FIG. 10 illustrates the operation from transmission of the request packet and to obtainment of the data by the terminal apparatus 11. A description will be made below about a case where the plural terminal apparatuses 11 attempt to obtain the same data from the device 14 via the relay apparatus 12. Specifically, a description will be made about a case where the terminal apparatus 11a and the terminal apparatus 11b transmit the request packets that specify the same name of data and attempt to obtain the corresponding data. It is assumed that the name of data is defined in accordance with a form that includes successive numbers or strings or a certain rule, for example, "/abc.com/device_xxx/data/0", "/abc.com/device_xxx/data/1", . . . , "/abc.com/device_xxx/data/k", and so forth.

The terminal apparatus 11a first transmits the request packet that specifies the name "/xyz/device/data/s1", for example, to the CCN network 10 (step S101).

The relay apparatus 12 next transfers the request packet that specifies the name "/xyz/device/data/s1", for example, toward the device 14 (step S102). Here, it is assumed that the relay apparatus 12 does not store the data that correspond to the name and transfers the received request packet toward the device 14.

Next, it is assumed that the data are not yet present in the device 14 at the point when the device 14 receives the request packet transmitted by the terminal apparatus 11a and a generation time $t_1$ of the data is known. In this case, the device 14 transmits the negative acknowledgement packet that includes the information about the generation time of the data to the CCN network 10 (step S103).

Next, the relay apparatus 12 that receives the negative acknowledgement packet stores the negative acknowledgement packet and transfers the packet toward the terminal apparatus 11a (step S104).

Next, it is assumed that the terminal apparatus 11b that is different from the terminal apparatus 11a transmits the request packet that specifies the name "/xyz/device/data/s1", for example, to the CCN network 10 (step S105).

The relay apparatus 12 next receives the request packet transmitted by the terminal apparatus 11b and then transmits the stored negative acknowledgement packet to the terminal apparatus 11b (step S106).

Next, the device 14 generates the data at the time $t_1$ (step S107), and the relay apparatus 12 deletes the stored negative acknowledgement packet (step S108).

The terminal apparatus 11a next retransmits the request packet because the time $t_1$ has passed (step S109).

Next, because the data that correspond to the request packet are not accumulated at the point when the relay apparatus 12 receives the request packet transmitted by the terminal apparatus 11a, the request packet is transferred toward the device 14 (step S110).

That is, the negative acknowledgement packet stored in the relay apparatus 12 is deleted from the relay apparatus 12 at the time $t_1$ because the expiration time has passed. Thus, the retransmitted request packet is transferred to the device 14.

Next, because the data are present in the device 14 at the point when the device 14 receives the request packet transmitted by the terminal apparatus 11a, the device 14 transmits the data packet that corresponds to the request packet to the CCN network 10 (step S111).

Next, the relay apparatus 12 that receives the data packet caches the data packet and transfers the data packet toward the terminal apparatus 11a (step S112).

Next, it is assumed that the terminal apparatus 11b retransmits the request packet to the CCN network 10 (step S113).

Next, the relay apparatus 12 receives the request packet transmitted by the terminal apparatus 11b and then transmits the stored data packet to the terminal apparatus 11b (step S114).

As described above, because the data packet that corresponds to the same request packet as the request packet and is delivered to the relay apparatus 12 after the request packet is stored in the relay apparatus 12, the request packet is not transferred to the device 14. That is, because the data packet is stored in the relay apparatus 12, the data packet may be transmitted to the terminal apparatus 11a and also to the terminal apparatus 11b.

Further, the negative acknowledgement packet that is once transmitted from the device 14 is temporarily stored in the relay apparatus 12. Accordingly, the number of the negative acknowledgement packets that are transmitted by the device 14 itself may be reduced, and at the same time the negative acknowledgement packet may efficiently be delivered to the plural terminal apparatuses 11.

Further, the information about the generation time of the data (here, generation time $t_1$, for example) is described in the negative acknowledgement packet. This allows the relay apparatus 12 to remove the negative acknowledgement packet at the time $t_1$ and allows the terminal apparatus 11a and the terminal apparatus 11b to retransmit the respective request packets after the time $t_1$ when the data are generated. Further, because the plural request packets are retransmitted from the terminal apparatus 11a and the terminal apparatus 11b almost synchronously with the generation time of the data, the relay apparatus 12 may transmit the data packet to the terminal apparatus 11a and also to the terminal apparatus 11b.

Accordingly, the relay apparatus 12 may efficiently deliver the data to the plural terminal apparatuses 11 with respect to the received request packets. In other words, the number of the data packets that are transmitted by the device 14 may be reduced. More specifically, the transmission times of the request packets that correspond to the same data are synchronized among the plural terminal apparatuses 11. Accordingly, the request storage unit (PIT) and the data storage unit (content store) of the relay apparatus 12 reduce the number of the requests delivered to the device 14. Thus, the number of the data packets transmitted by the device 14 (the number of transmissions) may be reduced. This is because the synchronization of the transmission times increases the possibility that the same data are not deleted from a memory area of the relay apparatus 12 but are stored in the data storage unit (content store).

[Effects of Embodiment and so Forth]

As described above, the embodiment may realize a device, a device management apparatus, a relay apparatus, and a terminal apparatus that facilitate power saving.

For example, when the terminal apparatus 11 attempts to obtain the data, the terminal apparatus 11 decides the name for the data in accordance with a predefined rule and transmits the request packet that has the description of the decided name. In a case where the technologies in above U.S. Pat. No. 8,386,622 and the above cited document "Networking Named Content" and the negative acknowledgement packets that are being provided in recent years are used and where the data that correspond to the request packet are not yet generated at the point when the request packet arrives at the device 14 or the device management apparatus 13, the device 14 or the device management apparatus 13 transmits the negative acknowledgement packet. However, the terminal apparatus 11 that receives the negative acknowledgement packet may not determine whether the data are absent because the name described in the request packet is incorrect or the data are not generated. Thus, because the terminal apparatus 11 does not recognize when to retransmit the request packet, the terminal apparatus 11 retransmits the request packet after a prescribed time elapses. Further, in a case where the data are not generated, the terminal apparatus 11 repeatedly transmits the request packet, and the device 14 or the device management apparatus 13 has to repeatedly transmit the negative acknowledgement packet until the data are generated or obtained. That is, even if the technologies in above U.S. Pat. No. 8,386,622 and the above cited document "Networking Named Content" and the negative acknowledgement packets that are being provided in recent years are used, power saving or reduction in the processing load of the device 14 or the device management apparatus 13 may not be facilitated.

By contrast, in this embodiment, the information about the generation time of the data is described in the negative acknowledgement packet, and the terminal apparatuses 11 may thereby be caused to retransmit the respective request packets after the time when the data are generated. Accordingly, the device 14 or the device management apparatus 13 may reduce the number of the negative acknowledgement packets to be transmitted. In addition, the device 14 or the device management apparatus 13 does not have to be started each time but is started simply at the generation time of the data, and power saving may thereby be facilitated. Further, the terminal apparatus 11 that transmits the request packet receives the negative acknowledgement packet that has the description of the information about the generation time of the data in the negative acknowledgement packet and may thereby retransmit the request packet after the time when the data are generated. Accordingly, the terminal apparatus 11 may reduce the number of the data packets that are transmitted by the data provider such as the device or the device management apparatus. Further, the terminal apparatus 11 may retransmit the request packet at the generation time of the data. Thus, the terminal apparatus 11 may reduce the number of the request packets to be transmitted, thereby reduce the processing load, and further facilitate power saving because unnecessary transmission of the request packets may be avoided and unnecessary power consumption may be reduced.

Further, for example, above U.S. Pat. No. 8,386,622 and the above cited document "Networking Named Content" describe that the relay apparatus 12 temporarily retains the data packet in the data storage unit but does not disclose a function of temporarily storing the negative acknowledgement packet. Thus, in above U.S. Pat. No. 8,386,622 and the above cited document "Networking Named Content", in a case where plural request packets whose corresponding data are absent are delivered to the device 14 or the device management apparatus 13, the negative acknowledgement packet is transmitted each time, thus hindering power saving and reduction of the processing load. By contrast, in this embodiment, the relay apparatus 12 may store the received negative acknowledgement packet in a case where the data that correspond to the name described in the request packet are absent in the device 14. Thus, after the storage of the negative acknowledgement packet, the relay apparatus 12 may respond with the negative acknowledgement packet without transferring the request packet to the device 14. Accordingly, the number of the data packets that are transmitted by the device 14 or the device management apparatus 13 may be reduced, and power saving of the device 14 or the device management apparatus 13 may thereby be facilitated.

In addition, in this embodiment, the information about the generation time of the data is described in the negative acknowledgement packet. This allows the relay apparatus to remove the negative acknowledgement packet at the generation time of the data and thus to transfer the request packet delivered from the terminal apparatus 11 after the time when the data are generated to the device 14 or the device management apparatus 13. Accordingly, the request packet may be transferred after the device 14 or the device management apparatus 13 are enabled to transmit the data packet. Thus, the number of the data packets that are transmitted by the device 14 or the device management apparatus 13 may be reduced. This facilitates power saving and reduction in the processing load.

As described above, the present disclosure may realize a device, a device management apparatus, a relay apparatus, and a terminal apparatus that facilitate power saving.

In the foregoing, a description has been made about the device, the device management apparatus, the relay apparatus, and the terminal apparatus according to one or plural aspects of the present disclosure, based on the embodiment. However, the present disclosure is not limited to this embodiment. Modes in which various kinds of modifications conceived by persons having ordinary skill in the art are applied to this embodiment and modes that are configured by combining elements in different embodiments may be included in the scope of the one or plural aspects of the present disclosure unless the modes depart from the gist of the present disclosure.

For example, cases described below are included in the present disclosure.

(1) A server, a router, and a reception terminal (hereinafter generically referred to as apparatuses) are specifically a computer system that is configured with a microprocessor, a ROM, a RAM, a hard disk unit, a display unit, a keyboard, a mouse, and so forth. The RAM or the hard disk unit stores a computer program. The microprocessor operates in accordance with the computer program, and the apparatuses thereby achieve their functions. Here, the computer program is configured by combining plural instruction codes that indicate commands for a computer in order to achieve prescribed functions.

(2) A portion of or all elements that configure the apparatuses may be configured with one system large scale integration (LSI). A system LSI is a super multi-function LSI that is manufactured by integrating plural configuration parts on one chip and is specifically a computer system configured to include a microprocessor, a ROM, a RAM, and so forth. The RAM stores a computer program. The microprocessor operates in accordance with the computer program, and the system LSI thereby achieves its function.

(3) A portion of or all elements that configure the apparatuses may be configured with IC cards or individual modules that are removable from the apparatuses. The IC card or the module is a computer system that is configured with a microprocessor, a ROM, a RAM, and so forth. The IC card or the module may include the super multi-function LSI. The microprocessor operates in accordance with a computer program, and the IC card or the module thereby achieves its function. This IC card or this module may be tamper-resistant.

(4) The present disclosure may be above-described methods. Further, the present disclosure may be a computer program that realizes those methods by a computer or digital signals that are configured with the computer program.

Further, the present disclosure may be computer-readable recoding media such as a flexible disk, a hard disk, a CD-ROM, an MO, a DVD, a DVD-ROM, a DVD-RAM, a Blu-ray Disc (BD), and a semiconductor memory that record the computer program or the digital signals. Further, the present disclosure may be the digital signals that are recorded in those recoding media.

Further, the present disclosure may be the computer program or the digital signals that are transmitted via an electric communication line, a wireless or wired communication line, a network represented by the Internet, data broadcasting, and so forth.

Further, the present disclosure may be a computer system that includes a microprocessor and a memory, in which a memory stores the computer program and the microprocessor operates in accordance with the computer program.

Further, the present disclosure may be practiced by another independent computer system by transporting the recording media that record the program or the digital signals or by transferring the program or the digital signals via the network.

(5) The embodiment and/or the modification examples may be combined together.

The present disclosure is usable for a device, a device management apparatus, a relay apparatus, a terminal apparatus, and so forth, and particularly usable for a device, a device management apparatus, a relay apparatus, a terminal apparatus, and so forth that are connected with a content centric network.

What is claimed is:

1. A device that is connected with a content centric network, the device comprising:
    a processor; and
    a non-transitory memory having stored therein instructions which, when executed by the processor, cause the processor to perform operations including
        receiving a request packet that requests data which are generated by the device;
        transmitting the requested data to the network in a case where the data that are requested by the request packet are present in the device; and
        transmitting, to the network, a packet that indicates a negative acknowledgement, which includes a next predetermined activation time of the device when the requested data are generated, in a case where the data that are requested by the received request packet are absent in the device.

2. The device according to claim 1,
    wherein the packet that indicates the negative acknowledgement is a negative acknowledgement packet.

3. The device according to claim 1,
    wherein the packet that indicates the negative acknowledgement is a data packet that indicates a negative acknowledgement.

4. The device according to claim 1,
    wherein the information about the generation time is information that indicates the generation time.

5. The device according to claim 1,
    wherein the next predetermined activation time indicates an expiration time of the packet that indicates the negative acknowledgement based on the next predetermined activation time.

6. The device according to claim 1,
    wherein the next predetermined activation time indicates a time when obtainment of the data is enabled based on the next predetermined activation time.

7. A device management apparatus that is connected with a content centric network, the device management apparatus comprising:
    a processor; and
    a non-transitory memory having stored therein instructions which, when executed by the processor, cause the processor to perform operations including
        obtaining data that are generated by a device that is connected with the device management apparatus;
        accumulating the obtained data in a recording medium;
        receiving a request packet that requests the data that are generated by the device;
        transmitting the requested data to the network in a case where the data that are requested by the request packet are accumulated;
        transmitting, to the network, a packet that indicates a negative acknowledgement, which includes a next predetermined activation time of the device when the requested data are generated, in a case where the data that are requested by the received request packet are not accumulated;
        accumulating the packet in the recording medium; and
        deleting the packet from the recording medium after the next predetermined activation time of the device.

8. A relay apparatus that is connected with a content centric network, the relay apparatus comprising:
    a processor; and
    a non-transitory memory having stored therein instructions which, when executed by the processor, cause the processor to perform operations, including
        receiving a packet that indicates a negative acknowledgement, which corresponds to a request packet that requests data, the negative acknowledgement including a next predetermined activation time of a device that generates the data,
        transferring the negative acknowledgement when the request packet is received,
        storing the packet in a recording medium, and
        deleting the packet from the recording medium after the next predetermined activation time of the device.

9. The relay apparatus according to claim 8,
    wherein in a case where the request packet is received and the packet is stored in the recording medium,
    the request packet is not transferred and the packet is transmitted to the network.

10. The relay apparatus according to claim 8,
    wherein the packet that indicates the negative acknowledgement is a negative acknowledgement packet.

11. The relay apparatus according to claim 8,
    wherein the packet that indicates the negative acknowledgement is a data packet that indicates a negative acknowledgement.

12. A terminal apparatus that is connected with a content centric network, the terminal apparatus comprising:
    a processor; and
    a non-transitory memory having stored therein instructions which, when executed by the processor, cause the processor to perform operations including
        transmitting a request packet that requests data;
        receiving a packet that indicates a negative acknowledgement that corresponds to the request packet, the negative acknowledgement including a next predetermined activation time of a device that generates data; and
        retransmitting the request packet after the next predetermined activation time of the device.

13. The terminal apparatus according to claim 12,
    wherein the packet that indicates the negative acknowledgement is a negative acknowledgement packet.

14. The terminal apparatus according to claim 12,
    wherein the packet that indicates the negative acknowledgement is a data packet that indicates a negative acknowledgement.

15. A communication method of a device that is connected with a content centric network, the communication method comprising:
    receiving a request packet that requests data which are generated by the device;
    transmitting the requested data to the network in a case where the data that are requested by the request packet are present in the device; and
    transmitting, to the network, a packet that indicates a negative acknowledgement, which includes a next predetermined activation time of the device when the requested data are generated, in a case where the data that are requested by the request packet are absent in the device.

16. A communication method of a device management apparatus that is connected with a content centric network, the communication method comprising:
- obtaining data that are generated by a device that is connected with the device management apparatus;
- accumulating the data in a recording medium;
- receiving a request packet that requests the data that are generated by the device;
- transmitting the requested data to the network in a case where the data that are requested by the request packet are accumulated;
- transmitting, to the network, a packet that indicates a negative acknowledgement, which includes a next predetermined activation time of the device when the requested data are generated, in a case where the data that are requested by the request packet are not accumulated:
  - accumulating the packet in the recording medium; and
  - deleting the packet from the recording medium after the next predetermined activation time of the device.

17. A communication method of a relay apparatus that is connected with a content centric network, the communication method comprising:
- receiving a packet that indicates a negative acknowledgement, which corresponds to a request packet that requests data, the negative acknowledgement including a next predetermined activation time of a device that generates the data,
- transferring the negative acknowledgement when the request packet is received,
- storing the packet in a recording medium, and
- deleting the packet from the recording medium after the next predetermined activation time of the device.

18. A communication method of a terminal apparatus that is connected with a content centric network, the communication method comprising:
- transmitting a request packet that requests data;
- receiving a packet that indicates a negative acknowledgement that corresponds to the request packet, the negative acknowledgement including a next predetermined activation time of a device that generates data; and
- retransmitting the request packet after the next predetermined activation time of the device.

* * * * *